(12) United States Patent
Elsasser et al.

(10) Patent No.: US 9,399,334 B2
(45) Date of Patent: Jul. 26, 2016

(54) METHOD FOR THE RIVETED FASTENING OF AN ACCESSORY

(75) Inventors: Carsten Elsasser, Pulheim (DE); Jochen Hild, Bonn (DE); Timo Kraemer, Rott (DE); Achim Kupper, Troisdorf (DE); Harald Lorenz, Bad Neuenahr-Ahrweiler (DE); Christoph Mehren, Konigswinter (DE); Thomas Wagner, Kerpen (DE)

(73) Assignee: Kautex Textron GmbH & Co. KG, Bonn (DE)

( * ) Notice: Subject to any disclaimer, the term of this patent is extended or adjusted under 35 U.S.C. 154(b) by 39 days.

(21) Appl. No.: 13/812,829

(22) PCT Filed: Jun. 30, 2011

(86) PCT No.: PCT/EP2011/003249
§ 371 (c)(1),
(2), (4) Date: Jan. 28, 2013

(87) PCT Pub. No.: WO2012/013276
PCT Pub. Date: Feb. 2, 2012

(65) Prior Publication Data
US 2013/0119077 A1    May 16, 2013

(30) Foreign Application Priority Data
Jul. 26, 2010  (DE) .......................... 10 2010 032279

(51) Int. Cl.
*B29C 65/60*      (2006.01)
*B29C 49/04*      (2006.01)
(Continued)

(52) U.S. Cl.
CPC .............. *B32B 7/08* (2013.01); *B29C 49/0047* (2013.01); *B29C 49/20* (2013.01); *B29C 65/56* (2013.01);
(Continued)

(58) Field of Classification Search
USPC .......... 264/531; 425/522; 220/745, 4.14, 653, 220/562, 567.2, 4.13; 156/92, 91, 308.2, 156/309.6, 245; 24/571; 29/527.1
See application file for complete search history.

(56) References Cited

U.S. PATENT DOCUMENTS 2,370,799 A * 3/1945 Kelley ........................... 285/200
3,167,817 A * 2/1965 Zalkind ................... B29C 33/00
                                                             264/154

(Continued)

FOREIGN PATENT DOCUMENTS

FR    WO 2010/015670    *  2/2010  ............. B29C 49/20
JP         56138718 S         3/1980

(Continued)

OTHER PUBLICATIONS

PCT International Search Report and Written Opinion mailed on Dec. 2, 2011, received in corresponding PCT Application No. PCT/EP11/03249, 9 pgs.

(Continued)

*Primary Examiner* — J. Gregory Pickett
*Assistant Examiner* — Gideon Weinerth
(74) *Attorney, Agent, or Firm* — Grossman Tucker Perreault & Pfleger, PLLC

(57) ABSTRACT

The invention relates to a method for the riveted fastening of an accessory to a plastics fuel tank (11, 12), the riveted fastening taking place at the time of the production of the tank by extrusion blow-molding of a split tubular preform or two web-like extruded preforms made of thermoplastic material by using a multi-part die after or during the molding of two complementary shells. The accessory (4) has been provided or is provided with at least one opening. The method according to the invention is characterized in that the riveted fastening takes place by means of at least one prefabricated rivet pin (9) made of thermoplastic material. The rivet pin has been obtained in a separate production process, for example by injection-molding.

21 Claims, 2 Drawing Sheets

(51) Int. Cl.
| | |
|---|---|
| *B29C 49/20* | (2006.01) |
| *B60K 15/03* | (2006.01) |
| *B32B 7/08* | (2006.01) |
| *B29C 49/00* | (2006.01) |
| *B29C 65/00* | (2006.01) |
| *B29C 65/56* | (2006.01) |
| *B29C 69/00* | (2006.01) |
| *B29K 23/00* | (2006.01) |
| *B29L 31/00* | (2006.01) |

(52) U.S. Cl.
CPC ........... *B29C 65/603* (2013.01); *B29C 66/1122* (2013.01); *B29C 66/21* (2013.01); *B29C 66/532* (2013.01); *B29C 66/61* (2013.01); *B29C 69/00* (2013.01); *B60K 15/03177* (2013.01); *B29C 49/04* (2013.01); *B29C 66/71* (2013.01); *B29C 66/73921* (2013.01); *B29C 66/8322* (2013.01); *B29C 2049/2021* (2013.01); *B29C 2049/2069* (2013.01); *B29K 2023/065* (2013.01); *B29K 2623/065* (2013.01); *B29L 2031/7172* (2013.01); *B29L 2031/737* (2013.01); *B60K 2015/03453* (2013.01)

(56) References Cited

U.S. PATENT DOCUMENTS

| | | | | |
|---|---|---|---|---|
| 3,358,550 A * | 12/1967 | Crowther | B21J 15/041 | |
| | | | 264/241 | |
| 3,742,995 A * | 7/1973 | Confer et al. | 220/660 | |
| 4,023,257 A * | 5/1977 | Wright et al. | 29/460 | |
| 4,304,530 A * | 12/1981 | Gens | 417/360 | |
| 4,396,562 A * | 8/1983 | Heaume | 264/445 | |
| 4,478,543 A * | 10/1984 | Lyon | B29C 65/602 | |
| | | | 411/15 | |
| 4,716,931 A * | 1/1988 | Shibamoto | 137/558 | |
| 4,719,072 A * | 1/1988 | Kojima et al. | 264/515 | |
| 4,750,513 A | 6/1988 | Griffin et al. | | |
| 4,891,000 A * | 1/1990 | Ishii | 425/522 | |
| 4,895,268 A * | 1/1990 | Hyde | 220/694 | |
| 4,959,190 A * | 9/1990 | Pfeiffer et al. | 264/516 | |
| 5,044,526 A * | 9/1991 | Sasaki et al. | 222/377 | |
| 5,086,997 A * | 2/1992 | Glass | B29C 65/606 | |
| | | | 244/123.3 | |
| 5,103,865 A * | 4/1992 | Hyde | 137/588 | |
| 5,139,043 A * | 8/1992 | Hyde et al. | 137/43 | |
| 5,193,262 A * | 3/1993 | Hyde et al. | 29/447 | |
| 5,308,427 A * | 5/1994 | Duhaime et al. | 156/245 | |
| 5,308,573 A * | 5/1994 | Hirakawa | 264/516 | |
| 5,326,514 A * | 7/1994 | Linden et al. | 264/83 | |
| 5,407,310 A * | 4/1995 | Kassouni | 411/107 | |
| 5,445,783 A * | 8/1995 | Irish et al. | 264/515 | |
| 5,522,417 A * | 6/1996 | Tomioka et al. | 137/43 | |
| 5,534,218 A * | 7/1996 | Daubenbuchel et al. | 264/516 | |
| 5,575,969 A * | 11/1996 | Yamamori et al. | 264/516 | |
| 5,891,385 A * | 4/1999 | Cerbelle et al. | 264/515 | |
| 6,189,567 B1 * | 2/2001 | Foltz | 137/587 | |
| 6,308,735 B1 * | 10/2001 | Foltz | 137/587 | |
| 6,338,420 B1 * | 1/2002 | Pachciarz et al. | 220/562 | |
| 6,415,941 B1 * | 7/2002 | Huse | 220/562 | |
| 6,435,365 B2 * | 8/2002 | Pachciarz et al. | 220/4.14 | |
| 6,499,500 B2 * | 12/2002 | Rosseel | 137/15.17 | |
| 6,619,264 B2 * | 9/2003 | Bolsover | B29C 33/52 | |
| | | | 123/456 | |
| 6,679,292 B2 * | 1/2004 | Ootaka et al. | 137/565.17 | |
| 6,706,235 B1 * | 3/2004 | Scherzer et al. | 264/479 | |
| 6,726,967 B2 * | 4/2004 | Vorenkamp et al. | 428/34.1 | |
| 7,059,305 B2 * | 6/2006 | Knaggs et al. | 123/509 | |
| 7,131,452 B2 * | 11/2006 | Potter et al. | 137/15.17 | |
| 7,232,158 B2 * | 6/2007 | Wilkendorf | 285/200 | |
| 7,320,769 B2 * | 1/2008 | Aoki et al. | 264/250 | |
| 7,455,190 B2 * | 11/2008 | Potter et al. | 220/4.14 | |
| 7,748,397 B2 * | 7/2010 | Firtion et al. | 137/15.17 | |
| 7,845,366 B2 * | 12/2010 | Brock et al. | 137/202 | |
| 7,906,062 B2 * | 3/2011 | Borchert et al. | 264/424 | |
| 7,922,949 B2 * | 4/2011 | Borchert et al. | 264/250 | |
| 8,122,604 B2 * | 2/2012 | Jannot et al. | 29/897.2 | |
| 8,591,798 B2 * | 11/2013 | Criel et al. | 264/515 | |
| 8,603,280 B2 * | 12/2013 | Borchert et al. | 156/243 | |
| 8,608,011 B2 * | 12/2013 | Asahara et al. | 220/562 | |
| 8,668,176 B2 * | 3/2014 | Araya et al. | 248/225.21 | |
| 2002/0020487 A1 * | 2/2002 | Vorenkamp et al. | 156/244.19 | |
| 2002/0043533 A1 * | 4/2002 | Gombert et al. | 220/4.13 | |
| 2002/0121517 A1 * | 9/2002 | Aoki et al. | 220/4.14 | |
| 2003/0044553 A1 * | 3/2003 | Ramanathan et al. | 428/35.8 | |
| 2003/0141304 A1 * | 7/2003 | Franjo et al. | 220/562 | |
| 2004/0250939 A1 | 12/2004 | Konishi | | |
| 2005/0016600 A1 * | 1/2005 | Knaggs et al. | 137/590 | |
| 2006/0022381 A1 * | 2/2006 | Brozenick et al. | 264/273 | |
| 2006/0102634 A1 * | 5/2006 | Potter et al. | 220/562 | |
| 2007/0290414 A1 * | 12/2007 | Criel | 264/531 | |
| 2008/0006625 A1 * | 1/2008 | Borchert et al. | 220/4.13 | |
| 2008/0078761 A1 * | 4/2008 | Borchert et al. | 220/4.13 | |
| 2008/0164639 A1 * | 7/2008 | Criel et al. | 264/511 | |
| 2008/0224363 A1 * | 9/2008 | Criel et al. | 264/526 | |
| 2009/0019683 A1 * | 1/2009 | Jannot et al. | 29/428 | |
| 2009/0047375 A1 * | 2/2009 | Borchert et al. | 425/541 | |
| 2009/0162472 A1 * | 6/2009 | Aoki et al. | 425/523 | |
| 2009/0309270 A1 * | 12/2009 | Buchholz et al. | 264/544 | |
| 2009/0324866 A1 * | 12/2009 | Bocker et al. | 428/36.7 | |
| 2010/0078842 A1 * | 4/2010 | Mellander | 264/40.5 | |
| 2010/0092600 A1 * | 4/2010 | Hamaji | B29C 49/20 | |
| | | | 425/522 | |
| 2010/0116366 A1 * | 5/2010 | Gattozzi et al. | 137/587 | |
| 2010/0126659 A1 * | 5/2010 | Roos et al. | 156/245 | |
| 2010/0212806 A1 * | 8/2010 | Lemoine et al. | 156/92 | |
| 2011/0035928 A1 * | 2/2011 | Mbog | B60K 15/077 | |
| | | | 29/428 | |
| 2011/0127761 A1 * | 6/2011 | Yoshizawa et al. | 280/834 | |
| 2011/0131771 A1 * | 6/2011 | Jannot et al. | 24/571 | |
| 2011/0131789 A1 * | 6/2011 | Pohlmann et al. | 29/525.06 | |
| 2011/0139342 A1 * | 6/2011 | Jannot et al. | 156/92 | |
| 2011/0221104 A1 * | 9/2011 | Criel et al. | 264/526 | |
| 2011/0315308 A1 * | 12/2011 | Borchert et al. | 156/243 | |
| 2012/0056356 A1 * | 3/2012 | Hall et al. | 264/533 | |
| 2012/0139168 A1 * | 6/2012 | Sun et al. | 264/523 | |
| 2012/0161373 A1 * | 6/2012 | Heim et al. | 264/540 | |
| 2012/0213574 A1 * | 8/2012 | Graf et al. | 403/270 | |
| 2012/0217673 A1 * | 8/2012 | Hutter, III | 264/219 | |
| 2012/0326357 A1 * | 12/2012 | Roos et al. | 264/529 | |
| 2013/0092317 A1 * | 4/2013 | Eulitz et al. | 156/245 | |
| 2013/0098536 A1 * | 4/2013 | Hofer et al. | 156/92 | |
| 2013/0112345 A1 * | 5/2013 | Bergmann et al. | 156/228 | |
| 2013/0119578 A1 * | 5/2013 | Grauer | 264/249 | |
| 2013/0175730 A1 * | 7/2013 | Hutter, III | 264/219 | |
| 2013/0277373 A1 * | 10/2013 | Borchert et al. | 220/567.2 | |
| 2013/0341825 A1 * | 12/2013 | Watanabe et al. | 264/250 | |
| 2014/0014663 A1 * | 1/2014 | Eulitz et al. | 220/562 | |
| 2014/0138866 A1 * | 5/2014 | Elsasser et al. | 264/40.4 | |
| 2014/0242325 A1 * | 8/2014 | Sutherland | B29C 49/20 | |
| | | | 428/99 | |
| 2014/0317891 A1 * | 10/2014 | Steiner et al. | 24/304 | |

FOREIGN PATENT DOCUMENTS

| | | |
|---|---|---|
| JP | 56138718 U | 10/1981 |
| JP | 2008507651 A | 3/2008 |
| JP | 2010533079 A | 10/2010 |
| WO | 2009007433 A1 | 1/2009 |

OTHER PUBLICATIONS

English translation of Japanese Office Action/Notification of Reasons for Refusal mailed Feb. 12, 2014, received in related Japanese Application No. JP-A-2013-520986, 3 pgs.
English translation of Korean Office Action/Notice of Grounds for Rejection issued Feb. 7, 2014, received in related Korean Application No. 2013-7002160, 4 pgs.
Canadian Office Action dated Feb. 6, 2014, received in related Canadian Application No. 2,798,877, 3 pgs.

\* cited by examiner

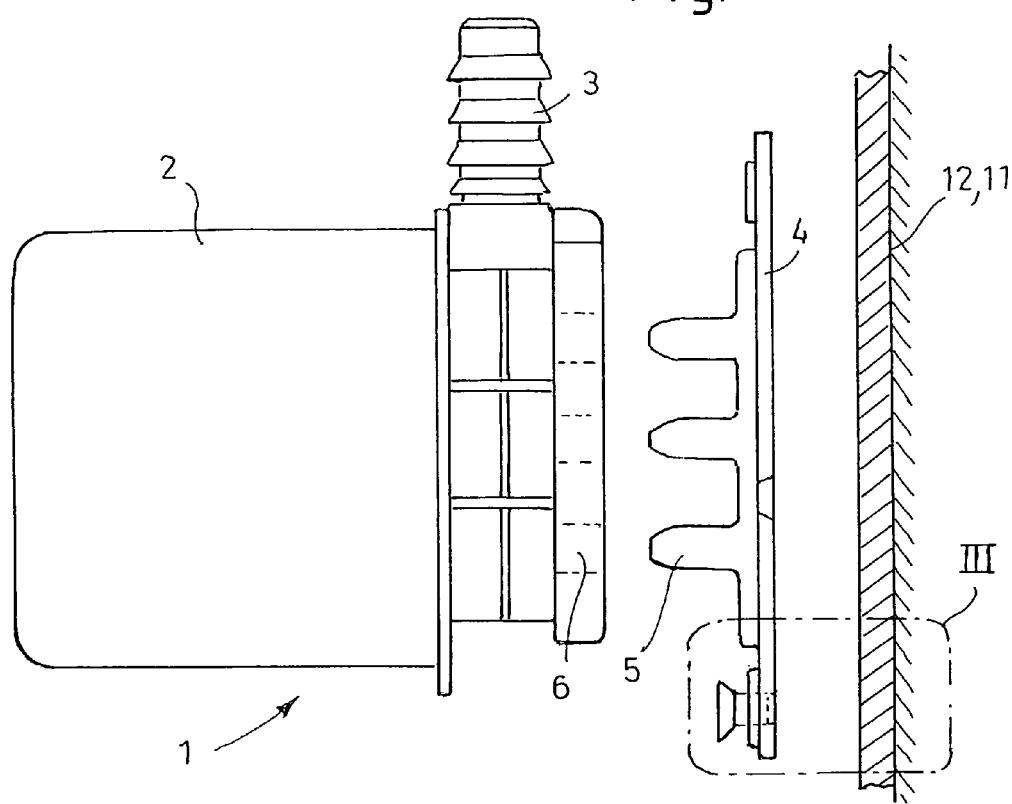
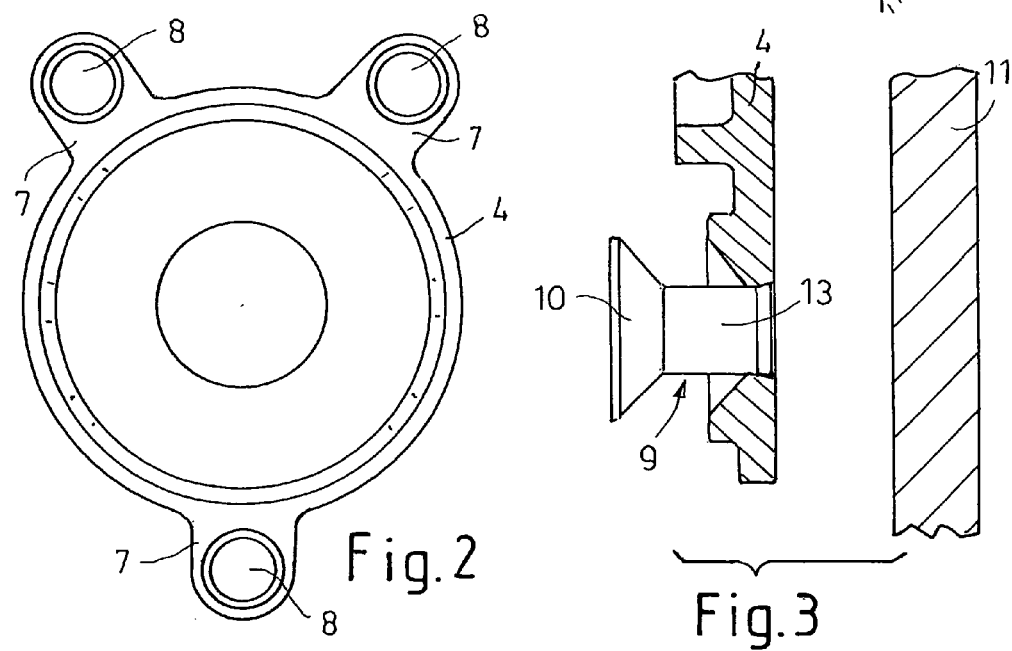

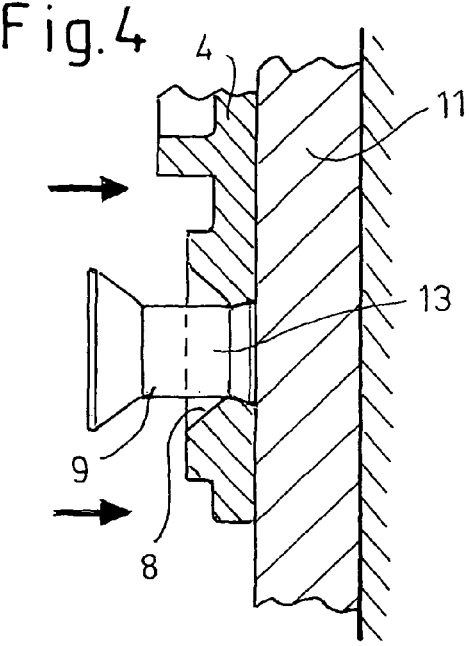
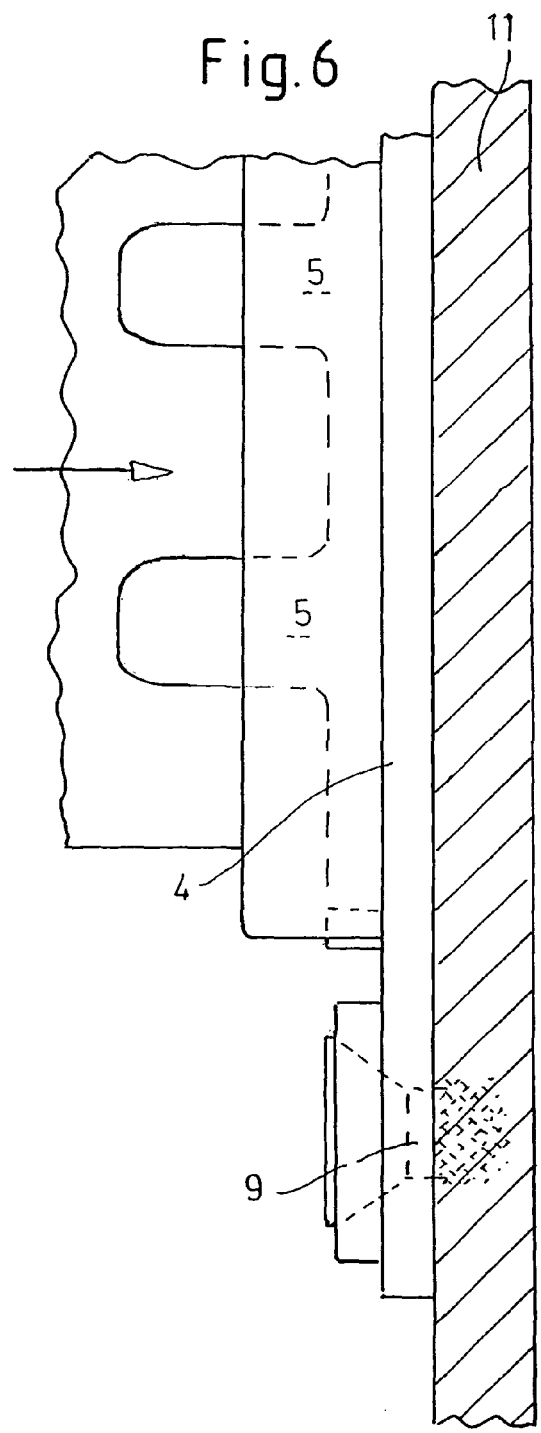
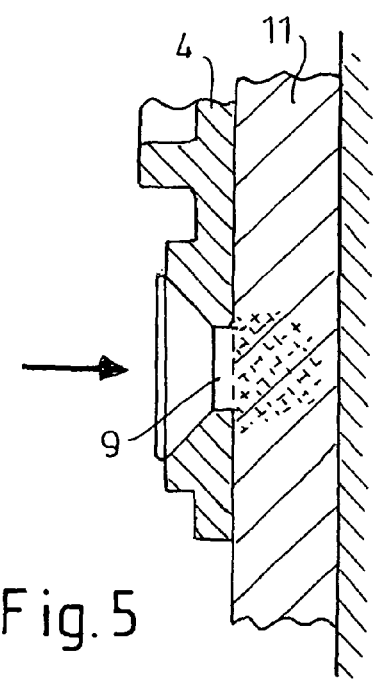

METHOD FOR THE RIVETED FASTENING OF AN ACCESSORY

The invention relates to a method for the riveted fastening of an accessory to a plastics fuel tank, the riveted fastening taking place at the time of the production of the tank by extrusion blow-moulding of a split tubular preform or two web-like extruded preforms made of thermoplastic material by using a multi-part extrusion die after or during the moulding of two complementary shells and the accessory having been or being provided with at least one opening.

Such a method is; for example, disclosed in EP 1 773 570 B1. In this method it is provided to fuse at least one part of the plastics material of which the wall of the tank consists, and to push through a portion of the molten plastics material through the opening of the accessory, without having to be detached from the remainder of the plastics material which has flowed out, and to give the protruding molten plastics material a corresponding shape in order to obtain a self-moulding plastics rivet. Accordingly, the plastics rivet is formed, in a manner of speaking, in situ from the fused plastics material of the tank wall.

This method is essentially associated with the drawback that when introducing the accessory into the fuel tank it is relatively complicated to form the rivet head by stamping or the like. This is, in particular, difficult when accessories have to be attached in the tank, the fastening points thereof not being easily accessible on the side remote from the tank wall.

As fuel tanks provided with accessories are produced in one operation, subsequently monitoring whether the rivet head of the riveted fastening is complete and correct is difficult to perform retrospectively when using the method disclosed in EP 1 773 570 B1 above. As it is desirable to use the riveted fastening for introducing accessories which consist of a plastics material which is not compatible in terms of weldability to the tank wall, the positive connection of the riveted connection plays an important role.

The object of the invention, therefore, is to improve a method for the riveted fastening of an accessory of the aforementioned type with regard to the practicability and reliability of the process. The object of the invention is further to provide a correspondingly configured fuel tank.

The object is initially achieved by a method for the riveted fastening of an accessory to a plastics fuel tank, the riveted fastening taking place at the time of the production of the tank by extrusion blow-moulding of a split tubular preform or two web-like extruded preforms made of thermoplastic material by using a multi-part extrusion die after or during the moulding of two complementary shells, and the accessory having been or being provided with at least one opening, the method being characterized in that the riveted fastening takes place by means of at least one prefabricated rivet pin made of thermoplastic material which has been obtained in a separate production process and which is welded to the tank wall passing through the opening of the accessory.

The method according to the invention provides the extrusion of a tubular preform, the division thereof into two planar sheets or webs and the bringing of the still hot melt material of the preforms between the open parts of a die. Instead of the extrusion of a tubular preform which, for example, has to be separated at diametrically opposing points, it may be provided to extrude two web-like preforms from wide-slot nozzles above the already open die. The method preferably initially comprises the moulding of two complementary shells/shell-shaped semi-finished products by utilizing the extrusion heat of the preforms. Into the still hot melt material of the shells/warm-plastic shells, at least one accessory is introduced before joining the shells to form a substantially closed fuel tank.

"Accessory" is understood within the meaning of the invention to be valves, conveyor units, baffle components, filling level lines, de-aerating lines and venting lines or the like.

The invention may be summarized in that the accessories are fastened by means of prefabricated rivet pins to the half-shells of the fuel tank which are not yet joined and are still located in the die, the rivet pins being welded to the still warm-plastic/hot melt material of the wall of the half-shells. Thus the rivet pin penetrates the tank wall and is fused therein and a connection is created in the sense of a welded connection with the tank wall. The rivet pin may be configured, for example, by a corresponding shaping of the shank, so that said shank also creates a positive connection with the tank wall.

The rivet pin(s) may already have been inserted into the openings of the accessory before introducing the accessory into the shells located in the die. Alternatively, the rivet pins may be injected into the openings of the accessory already positioned on the tank wall.

The rivet pin may, for example, have a slotted shank or a shank provided with projections, so that said shank is captively secured in the relevant opening and/or is able to be inserted captively into the opening.

In a preferred variant of the method according to the invention, it is provided that at least one rivet pin is used with an integrally formed rivet head.

Preferably, the shells are moulded by utilizing the extrusion heat of the preforms, the rivet pin being welded to the still hot melt material of the wall of the shells.

In a preferred variant of the method according to the invention, it is provided that the introduction and riveting of the accessory takes place by using a blow-moulding die with at least two outer moulds comprising in each case a cavity, and an accessory carrier which may be moved between the outer moulds. Via the accessory carrier at least one accessory may be actively introduced into the shells by means of corresponding devices. A fastening of the accessory to the wall of the still hot melt material of the shells may also take place passively by utilizing the closing movement of the outer moulds/blow mould halves.

In an expedient variant of the method according to the invention, it is provided that the accessory carrier is integrated in a central die or a central frame, or is configured as a central die or central frame, the outer moulds being able to be moved towards the central frame.

In a particularly advantageous variant of the method according to the invention, it is provided that the riveted fastening is carried out after moulding the shells, the moulding of the shells taking place during or immediately after an initial closing of the outer moulds. It has proved particularly advantageous initially to close the outer moulds against a central frame or against a sealing frame, in order to apply the hot melt material of the preforms by the application of differential pressure onto the outer moulds, inside the cavity thus sealed. Subsequently, the die may be opened and the sealing frame may be removed from the outer moulds of the die. This has the advantage that with the now only partially closed die, a relatively simple manipulation is possible on the sides of the shells remote from the die, which represent the subsequent tank inner wall. With a second or third closing of the dies, the shells may finally be welded together to form a closed fuel tank.

Preferably, the riveted fastening is carried out after or during a further closing of the outer moulds, i.e. after the moulding of the shells is complete.

Although it is possible, in principle, to weld the rivet pin(s) to the wall of the shells in a cold and completely cured state, in a preferred variant of the method it is provided to heat up the rivet pins before welding to the wall. For example, an accessory already equipped with rivet pins may be held in the central die. Via infrared head radiators integrated in the central die, the accessory may be heated/warmed up with the rivet pins located therein and subsequently pressed against the wall of the shells by the corresponding action of force.

Expediently, the rivet pin has been obtained by the injection-moulding of thermoplastic material. This plastics material may, for example, be HDPE (High Density Polyethylene) which is compatible in terms of weldability with the tank wall which is made of HDPE or based on HDPE.

Expediently, an accessory is used with a fastening base which has a plurality of fastening lugs provided with openings which, immediately before introducing the accessory, in each case have been provided with rivet pins passing through said accessory.

The object of the invention is further achieved by a fuel tank made of thermoplastic material comprising at least one accessory arranged inside the tank, which is riveted to the tank wall through at least one opening, the fuel tank being characterized in that the opening is passed through by a rivet pin welded to the tank wall, which has been obtained in a separate production process.

The invention is explained hereinafter with reference to an exemplary embodiment shown in the drawings.

As mentioned above, the accessory may have been provided with rivet pins before the introduction thereof into the tank. To this end, it is advantageous if the rivet pins are captively connected to the accessory. For example, the rivet pins may have a shank which is profiled and/or slotted, so that the rivet pins may be latched in the openings by corresponding force expenditure.

The shank of the rivet pins may, moreover, be provided with a correspondingly configured surface which simplifies the melting or fusion of the rivet pin in the tank wall. The shank of the rivet pins may be dimensioned so that said shank is held with a certain clearance inside the openings, so that when welding the rivet pins to the tank wall it is possible to compensate for shrinkage. Different degrees of shrinkage distortion in the material occur with different material thicknesses, in particular due to the variable thermal capacities of the material.

Finally, the shanks of the rivet pins may be profiled so that said shanks, when melted/fused-on or when penetrating the molten material of the tank wall, produce a positive connection with the tank wall, so that a combination of a material connection and a positive connection is produced.

In the drawings:

FIG. 1: shows and exploded view of an accessory according to the invention,

FIG. 2: shows a view of the fastening base of the accessory,

FIG. 3: shows the detailed view III in FIG. 1,

FIGS. 4 to 6: show schematic views of the riveting and fastening process of the accessory shown in FIG. 1.

The method according to the invention initially provides the continuous extrusion of two web-like preforms which are extruded between the open halves of a three-part blow-moulding die and namely initially between in each case one blow mould half and a die separator/sealing frame arranged between the blow mould halves. In a further method step, the blow mould halves are closed against the die separator arranged therebetween with the interposition of the preforms. Superimposed onto this closing movement of the blow mould halves is a displacement movement of a basic frame of the blow-moulding machine underneath and away from the extrusion head. The mould cavity of the blow-moulding die is closed, the die separator arranged between the blow mould halves sealing the cavity of the blow-moulding die. Then by using a vacuum and/or overpressure the preforms are drawn into the cavities of the blow mould halves and moulded to form shells.

In a further method step, a component carrier/accessory carrier is placed between the blow mould halves. Then the blow mould halves are again closed. Fully closing the blow mould halves during this process in the sense of sealing is not absolutely necessary.

In a further method step, accessories/components are joined to the shells moulded in the cavities and/or fastened thereto, via the accessory carrier/component carrier.

An accessory such as an operational venting valve 1 is, for example, shown in FIG. 1. The operational venting valve 1 comprises a valve housing 2 with a nipple 3 for attaching to a venting line and a fastening base 4, which is clipped/latched to the valve housing 2 via the latching tongues 5 which penetrate corresponding latching recesses 6. The operational venting valve 1 shown is configured as a so-called "roll-over valve".

The fastening base 4 of the operational venting valve is provided with three fastening lugs 7, which in each case have an opening 8. The opening 8 is configured as a recessed, circular hole and receives a rivet pin 9, which has a countersunk head 10 with a contour corresponding to the recess of the opening 8.

The rivet pin 9 consists of thermoplastic material and has been prefabricated by injection-moulding and, before inserting the operational venting valve 1 into the fuel tank, has been inserted into the relevant opening 8 of the fastening base 4. The fastening base 4 may also consist of thermoplastic material, for example also HDPE, which for example may be welded to an inner layer 11 of the tank wall 12 of the fuel tank.

The rivet pin 9 also consists of HDPE and is also compatible in this sense with the inner layer 11 of the tank wall 12.

In the exemplary embodiment shown, the operational venting valve 1 is provided with a removable and latchable fastening base 4, in principle this may also be configured in one piece. In the present case, the valve housing 2 consists of POM (polyoxymethylene) whilst the fastening base consists of HDPE, neither material being compatible with one another in terms of weldability.

In the method according to the invention, the operational venting valve 1 provided with rivet pins 9 and/or the fastening base 4 provided with rivet pins during the moulding of the tank is welded to the tank wall 12 via the rivet pins passing through the openings 8, as for example shown in FIGS. 4 to 6. The rivet pin 9 is driven by means of a suitable aid/tool through the openings 8 into the still warm-plastic/hot melt material of the inner layer 11 of the tank wall 12, so that the shank 13 of the rivet pins is fused with the inner layer 11 of the tank wall 12 whilst the countersunk head 10 of the rivet pin 9 is completely incorporated in the openings 8. After the tank wall 12 has cured, therefore, an intimate connection is produced between the rivet pins 9 and the tank wall 12, the countersunk head 10 of the rivet pins 9 holding the fastening base 4 and thus the valve housing 2 positively latched thereto against the tank wall 12.

LIST OF REFERENCE NUMERALS

1 Operational venting valve
2 Valve housing

3 Nipple
4 Fastening base
5 Latching tongues
6 Latching recesses
7 Fastening lugs
8 Opening
9 Rivet pin
10 Countersunk head
11 Inner layer
12 Tank wall
13 Shank

What is claimed is:

1. A method for the riveted fastening of an accessory to a plastics fuel tank, comprising:
the riveted fastening taking place at the time of a production of the tank by extrusion blow-moulding of a split tubular preform or two web-like extruded preforms made of thermoplastic material by using a multi-part extrusion die after or during a moulding of two complementary shells in a blow-moulding die, and the accessory having been or being provided with at least one opening, wherein the riveted fastening takes place by at least one prefabricated rivet pin having a head and a shank and made of thermoplastic material which has been obtained in a separate production process, wherein the shank of the at least one prefabricated rivet pin is inserted into the at least one opening of the accessory before introducing the accessory into the shells located in the blow-moulding die, wherein at least a portion of the shank of the at least one prefabricated rivet pin passes through the at least one opening of the accessory, and wherein at least a portion of the shank of the at least one prefabricated rivet pin which passes through the at least one opening of the accessory is welded to a wall of the tank without passing completely through the wall of the tank.

2. The method according to claim 1, wherein the at least one prefabricated rivet pin comprises an integrally formed rivet head.

3. The method according to claim 1, wherein the shells are moulded by utilizing heat from extrusion of the preforms, the at least one prefabricated rivet pin being welded to the heated thermoplastic material of the wall of the shells.

4. The method according to claim 1, wherein the introduction and riveting of the accessory takes place with the blow-moulding die, wherein the blow-moulding die comprises at least two outer moulds comprising in each case a cavity, and an accessory carrier which may be moved between the outer moulds.

5. The method according to claim 4, wherein the accessory carrier is integrated in a central die or a central frame, or is configured as a central die or central frame, the outer moulds being able to be moved towards the central frame.

6. The method according to claim 4, wherein the riveted fastening is carried out after moulding the shells, the moulding of the shells taking place during or immediately after an initial closing of the outer moulds.

7. The method according to claim 6, wherein the riveted fastening is carried out after or during a further closing of the outer moulds.

8. The method according to claim 1, wherein the at least one prefabricated rivet pin is heated before welding to the wall of the shells.

9. The method according to claim 1, wherein the at least one prefabricated rivet pin is obtained by the injection-moulding of thermoplastic material.

10. The method according to claim 1, wherein the accessory includes a fastening base which has a plurality of fastening lugs provided with a plurality of the openings which, immediately before introducing the accessory, in each case have been provided with rivet pins passing through said accessory.

11. A fuel tank made of thermoplastic material comprising at least one accessory arranged inside the tank, which is riveted to a tank wall through at least one opening, characterized in that the at least one opening is passed through by the at least one prefabricated rivet pin welded to the tank wall, which has been obtained in a separate production process, wherein the fuel tank is produced by a method according to one of claims 1 to 10.

12. A method for the riveted fastening of an accessory to a plastics fuel tank, comprising:
the riveted fastening taking place at the time of a production of the tank by extrusion blow-moulding of a split tubular preform or two web-like extruded preforms made of thermoplastic material by using a multi-part extrusion die after or during a moulding of two complementary shells in a blow-moulding die, and the accessory having been or being provided with at least one opening, wherein the riveted fastening takes place by at least one prefabricated rivet pin having a head and a shank and made of thermoplastic material which has been obtained in a separate production process, wherein the shank of the at least one prefabricated rivet pin is inserted into the at least one opening of the accessory before introducing the accessory into the shells located in the blow-moulding die, wherein at least a portion of the shank of the at least one prefabricated rivet pin passes through the at least one opening of the accessory, and wherein at least a portion of the shank of the at least one prefabricated rivet pin which passes through the at least one opening of the accessory melts or fuses in a wall of the tank.

13. The method according to claim 12, wherein the at least one prefabricated rivet pin comprises an integrally formed rivet head.

14. The method according to claim 12, wherein the shells are moulded by utilizing heat from extrusion of the preforms, the at least one prefabricated rivet pin being welded to the heated thermoplastic material of the wall of the shells.

15. The method according to claim 12, wherein the introduction and riveting of the accessory takes place with the blow-moulding die, wherein the blow-moulding die comprises at least two outer moulds comprising in each case a cavity, and an accessory carrier which may be moved between the outer moulds.

16. The method according to claim 15, wherein the accessory carrier is integrated in a central die or a central frame, or is configured as a central die or central frame, the outer moulds being able to be moved towards the central frame.

17. The method according to claim 15, wherein the riveted fastening is carried out after moulding the shells, the moulding of the shells taking place during or immediately after an initial closing of the outer moulds.

18. The method according to claim 17, wherein the riveted fastening is carried out after or during a further closing of the outer moulds.

19. The method according to claim 12, wherein the at least one prefabricated rivet pin is heated before welding to the wall of the shells.

20. The method according to claim 12, wherein the at least one prefabricated rivet pin is obtained by the injection-moulding of thermoplastic material.

21. The method according to claim 12, wherein the accessory includes a fastening base which has a plurality of fastening lugs provided with a plurality of the openings which, immediately before introducing the accessory, in each case have been provided with rivet pins passing through said accessory.

\* \* \* \* \*